United States Patent
Chao

(10) Patent No.: US 9,564,625 B2
(45) Date of Patent: Feb. 7, 2017

(54) FLEXIBLE CASCADE UNIT FOR CASCADING ELECTRICAL ELEMENTS AND DEVICE THEREOF

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 481 days.

(21) Appl. No.: 14/231,439

(22) Filed: Mar. 31, 2014

(65) Prior Publication Data

US 2015/0280199 A1    Oct. 1, 2015

(51) Int. Cl.
*H01M 2/20*    (2006.01)
*H01M 2/10*    (2006.01)

(52) U.S. Cl.
CPC ........... *H01M 2/204* (2013.01); *H01M 2/1061* (2013.01); *H01M 2/1005* (2013.01); *H01M 2220/30* (2013.01)

(58) Field of Classification Search
CPC  H01M 2220/30; H01M 2/204; H01M 2/1005; H01M 2/1061
See application file for complete search history.

(56) References Cited

U.S. PATENT DOCUMENTS 2,286,415 A * 6/1942 Hewel ................... H01M 2/206
                                                                24/698.3
2011/0162883 A1* 7/2011 Groset ................ B29C 45/0055
                                                                174/70 R

FOREIGN PATENT DOCUMENTS

CN          2518238 Y    10/2002

* cited by examiner

*Primary Examiner* — Basia Ridley
*Assistant Examiner* — Heng Chan

(57) ABSTRACT

A flexible cascade unit for cascading electrical elements and device thereof are provided. The cascade unit includes a first series connection portion, a second series connection portion and a flexible structure. The flexible structure is integrally formed between the first and second series connection portions, and has a first flexible rib and a second flexible rib. Each of the first and second flexible ribs respectively clads a conducting wire. Each conducting wire has two conducting ends respectively extended to the first and second series connection portions. As such, a flexible strip-like object can be formed, and be attached at an arm, waist or wrist of a person to be readily portable and wearable.

12 Claims, 4 Drawing Sheets

FLEXIBLE CASCADE UNIT FOR CASCADING ELECTRICAL ELEMENTS AND DEVICE THEREOF

BACKGROUND OF THE INVENTION

Field of the Invention

The present invention relates to an electronic accessory, and more particularly, to a flexible cascade unit for cascading electrical elements and device thereof.

Description of the Prior Art

To connect conventional electrical elements such as batteries into serial or parallel connection, flexibility in an overall structure cannot be provided due to contacts of conductive elements. For example, a battery needs to be placed to be in contact with conductive plates in a battery container in order to achieve serial or parallel electrical connection. Thus, restricted by the above concept, the conventional arrangement of batteries cannot be effectively expanded, and thus is not readily portable and wearable.

In a common watch, a battery is disposed inside a watch head, whose two ends are then connected by a strap to allow a user to wear the watch. With a limited space for disposing a battery within the watch head, the battery disposed frequently has specifications of a smaller capacity and a smaller volume, or even a lower electrical capacity and a shorter life cycle again due to the small space available. Further, a battery applied for military uses need to take portability and durability into considerations. However, conventional batteries for military uses do not possess such characteristics.

In view of the above, to improve the above and overcome the above drawbacks, the Applicant, with dedicated researches combined with theoretical knowledge, finally provides the present invention that has a reasonable design and effectively overcomes the above drawbacks.

SUMMARY OF THE INVENTION

It is a primary object of the present invention to provide a flexible cascade unit for cascading electrical elements, e.g., a plurality of electrical elements such as batteries. Through a cascade structure, a strip-like object is formed based on the flexibility and can be attached at an arm, waist or wrist of a person to be readily portable and wearable.

To achieve the above object, a flexible cascade unit for cascading electrical elements is provided by the present invention. The flexible cascade unit includes a first series connection portion, a second series connection portion and a flexible structure. The flexible structure is a formed integral between the first and second series connection portions, and clads a conducting wire. The conducting wire has two conducting ends respectively extended to the first and second series connection portions.

It is another object of the present invention to provide a flexible cascade device for cascading electrical elements. Through the foregoing flexible cascade device, an electrical capacity of the cascade device can be significantly increased and be applied to, for example, a strap of a watch to increase the electrical capacity of the watch.

To achieve the above object, a cascade device for flexible electrical elements is provided. The cascade device for flexible electrical elements includes two electrical elements, and a cascade unit cascaded between the two electrical elements. A first series connection portion of the cascade unit is adjacent to one side of one of the electrical elements, and a second series connection portion of the cascade unit is adjacent to one side of the other of the electrical elements. Further, a conducting wire in the flexible structure is electrically connected to the two electrical elements, respectively.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE EMBODIMENTS

To allow the Examiner to further understand the characteristics and technical contents of the present invention, detailed description of the present invention is given below with reference to the accompanying drawings. It should be noted that these drawings are for reference and for better explaining the present invention, not limiting the present invention.

Figure 1:
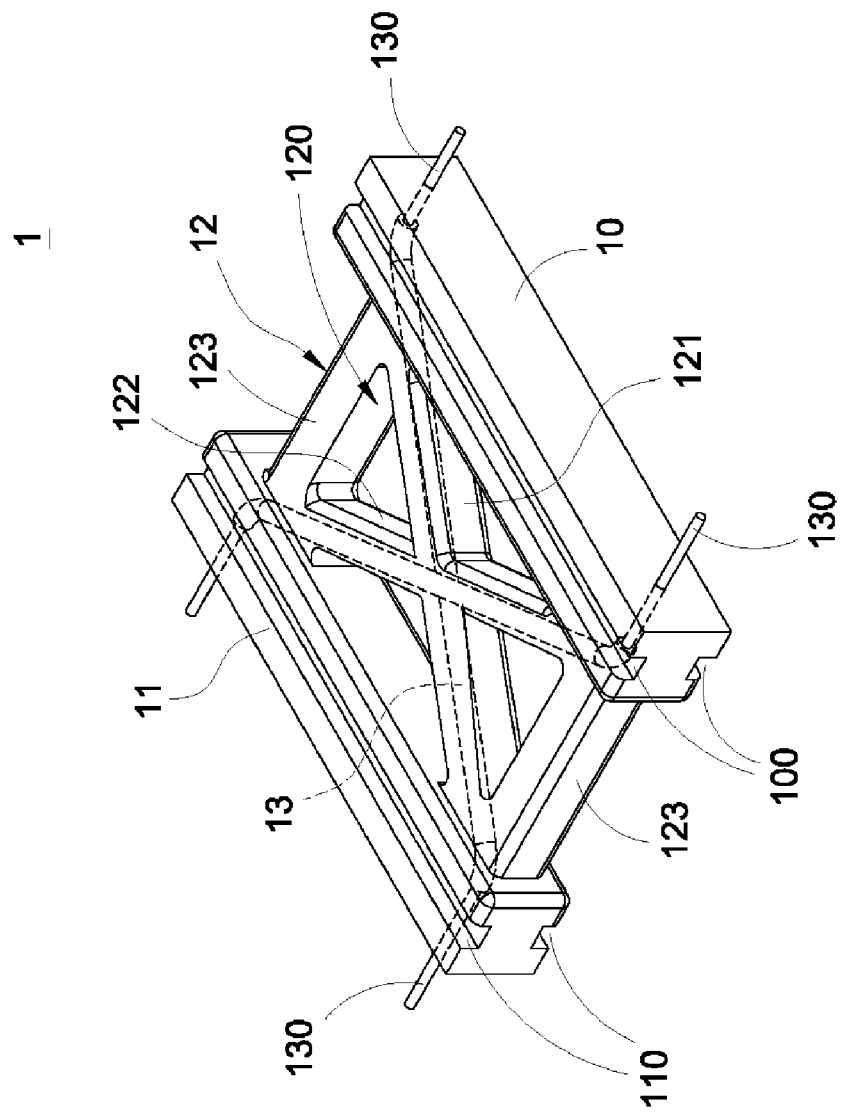
FIG. 1 is a schematic diagram of a cascade unit according to an embodiment of the present invention.
Figure 2:
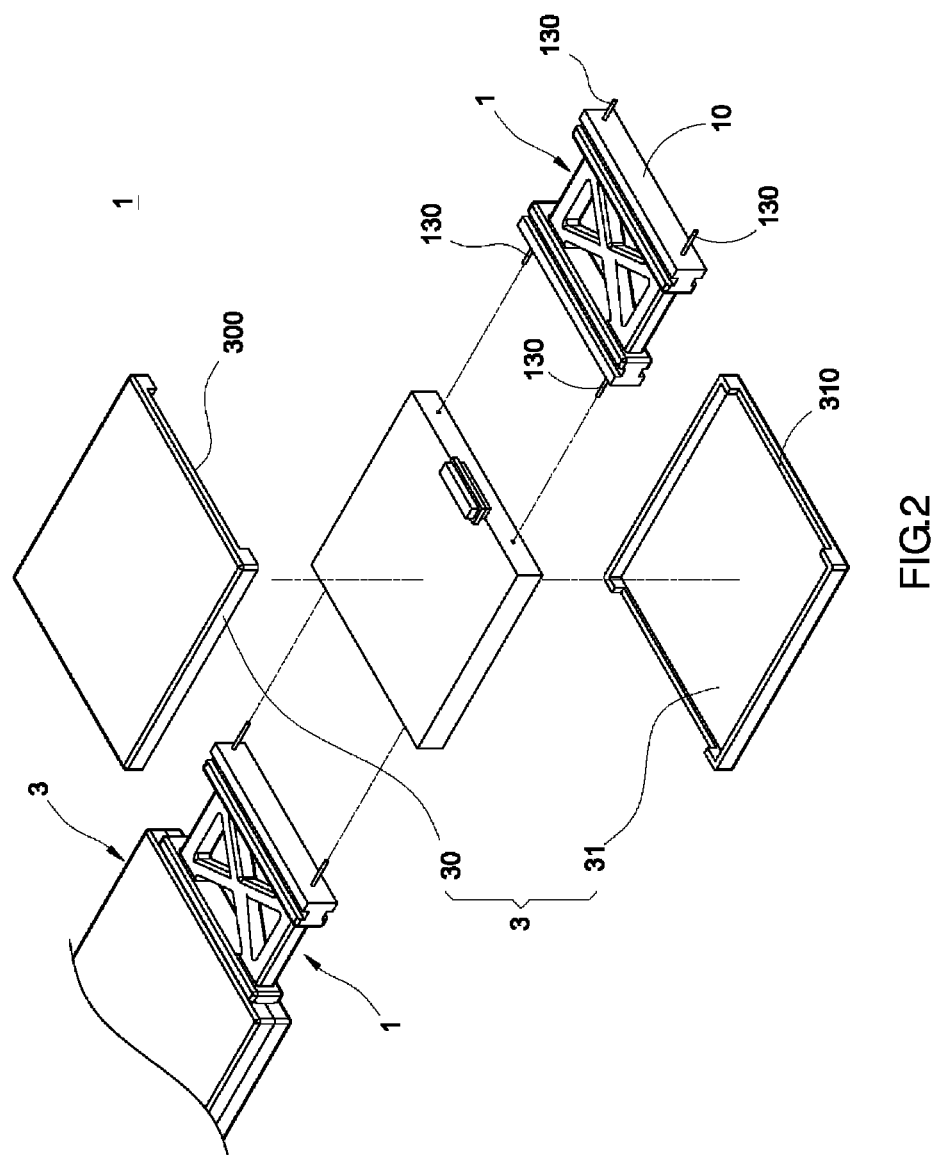
FIG. 2 is an exploded view of a cascade device according to an embodiment of the present invention.
Figure 3:
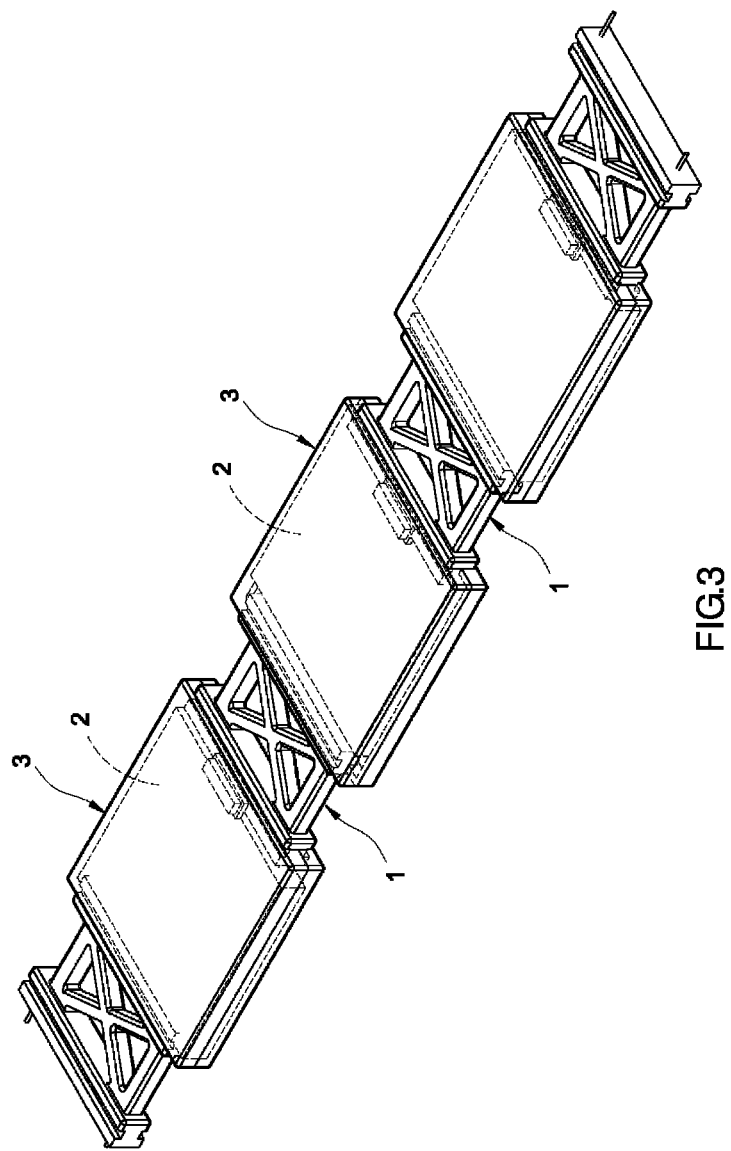
FIG. 3 is a schematic diagram of a cascade device combined with one another according to an embodiment of the present invention.

FIG. 1 shows a schematic diagram of a cascade unit according to an embodiment of the present invention. A flexible cascade unit for cascading electrical elements and device thereof are provided. Referring to FIG. 1, a cascade unit 1 is cascaded between two electrical elements 2. Referring to FIG. 2 and FIG. 3, by cascading a plurality of electrical elements 2, a strip-like object is formed, and can be attached at an arm, a waist and a wrist of a person to be readily portable and wearable. The electrical element 2 may be a battery.

Again referring to FIG. 1, the cascade unit 1 may be integrally of a flexible material such as rubber by means of injection molding. The cascade unit 1 includes a first series connection portion 10, a second series connection portion 11, and a flexible structure 12. The flexible structure 12 is integrally formed between the first series connection 10 and the second series connection portion 11, and includes a plurality of hollow deformation spaces 120. When the first and second series connection portions 10 and 11 of the cascade unit 1 receive external forces such as pulling, the flexible structure 12 of may produce corresponding appearance changes with the deformation spaces 120. In an embodiment of the present invention, the flexible structure 12 may be an X-shape, and has a first flexible rib 121 and a second flexible rib 122, which are in crossing and integrally formed. The deformation spaces 120 are between the first and second flexible ribs 121 and 122. A reinforcement rib 123 may be further externally provided between the first and second flexible ribs 121 and 122. The reinforcement rib 123 may be integrally formed with the flexible structure 12 by the foregoing injection molding, and is for reinforcing the flexible structure 12 for withstanding external forces.

As illustrated in FIG. 1, in an embodiment of the application each of the first and second flexible ribs 121 and 122 of the flexible structure 12 respectively clads a conducting wire 13. Each conducting wire 13 has two conductive ends 130, which are extended to the exterior via the first series connection portion 10 and the second series connection portion 11, respectively. Again referring to FIG. 2 and FIG. 3, the cascade unit 1 is cascaded between any two electrical elements 2, the first series connection portion 10 of the cascade unit 1 is adjacent to one side of one electrical elements 2, and the second series connection portion 11 is adjacent to one side of the other electrical elements 2. Meanwhile, the two conductive ends 130 of each conductive wire 13 of the cascade unit 1 are electrically connected to two electrical elements 2 respectively, so as to be electrically cascaded between two electrical elements 2 to form a strip-like object and form the cascade device of the present invention (as shown in FIG. 3). In an embodiment of the present invention, to electrically connect the two conductive ends 130 of each conducting wire 13 and two electrical elements 2, the two conductive ends 130 of each conducting wire 13 respectively extend through the first series connection portion 10 and the second series connection portion 11 of the cascade unit 1 respectively, to be directly electrically connected to conductive portions of the electrical element 2, and may be combined by means such as soldering.

Figure 4:
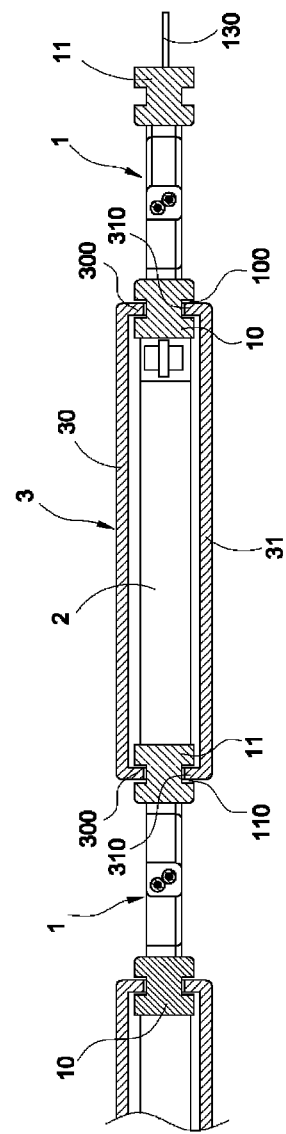
FIG. 4 is a sectional view of a cascade device according to an embodiment of the present invention.

Referring to FIG. 4, each of the electrical elements 2 may correspond to a housing 3 that covers the electrical element 2. Further, the housing 3 may serve for purposes including waterproof and dustproof functions as well as offering a pleasant appearance. To have the housing 3 further protect connected parts between the cascade unit 1 and the electrical element 2, the first and second series connection portions 10 and 11 of the cascade unit 1 are provided with waterproof grooves 100 and 110, and an inner edge of the housing 3 is provided with waterproof ridges 300 and 310 for embedding into the waterproof grooves 100 and 110, respectively. More specifically, each housing 3 is formed by an upper cover 30 and a lower cover 31 covered onto each other. The upper cover 30 is provided with the waterproof ridge 300 that correspond to the waterproof grooves 100, 110 of the first and second series connection portions 10 and 11; similarly, the lower cover 31 is provided with the waterproof ridge 310 that corresponds with the waterproof grooves 100, 110 of the first and second series connection portions 10 and 11. As such, by clamping the electrical element 2 between the upper cover 30 and the lower cover 31, the waterproof ridges 300 and 310 are pressed into the waterproof grooves 100, 110 to achieve an adhesion effect. Further, the upper and lower covers 30 and 31 may be combined through other means such as ultrasonic fusion.

It should be noted that, in the aforementioned cascade structure with the electrical elements 2, the cascade device further includes a control unit (not shown) cascaded. The control unit is electrically connected to and controls the cascade unit 1.

Therefore, with the flexible cascade unit for cascading electrical elements and device thereof, a plurality of electrical elements such as batteries may be structurally cascaded to achieve the object of expansion. Meanwhile, with the flexibility provided, a strip-like object can be formed, and can be attached to an arm, a waist, a wrist of a person to be readily portable and wearable. Particularly, the strip-like object formed is suitably applicable to a watchstrap or military supplies.

In conclusion, the present invention is capable of achieving the expected utilization object and overcomes the drawbacks of the prior art. Further, the present invention provides novelty and non-obviousness that fully satisfy application requirements. Therefore, an application is raised according to patent laws. Thorough examinations and a grant to the application for protecting the rights of the Inventor shall be appreciated.

While the invention has been described in terms of what is presently considered to be the most practical and preferred embodiments, it is to be understood that the invention needs not to be limited to the above embodiments. Therefore, equivalent techniques, means and modifications based on the description and diagrams of the application are to be regarded within the scope of the present invention.

What is claimed is:

1. A flexible cascade unit for cascading electrical elements, comprising:
    a first series connection portion;
    a second series connection portion; and
    a flexible structure, being integrally formed between the first series connection portion and the second series connection portion, wherein the flexible structure comprises a plurality of hollow deformation spaces;
    wherein the flexible structure further comprises a first flexible rib and a second flexible rib, the first and second flexible ribs cross and are integrally formed, each of the first and second flexible ribs respectively clads a conducting wire, and each conducting wire has two conductive ends respectively extended to the first series connection portion and the second connection portion.

2. The flexible cascade unit for cascading electrical elements as claimed in claim 1, further comprising a reinforcement rib formed between respective ends of the first and second flexible ribs, for reinforcing the flexible structure for withstanding an external force.

3. The flexible cascade unit for cascading electrical elements as claimed in claim 1, wherein two conductive ends of each conducting wire respectively extend through the first series connection portion and the second series connection portion.

4. A cascade device for flexible electrical elements, comprising:
    two electrical elements;
    a cascade unit, cascaded between the two electrical elements, comprising:
        a first series connection portion, being adjacent to one side of one of the electrical elements;
        a second series connection portion, being adjacent to one side of the other of the electrical elements; and
        a flexible structure, being integrally formed between the first series connection portion and the second series connection portion;
    wherein the flexible structure further comprises a first flexible rib and a second flexible rib, each of the first and second flexible ribs respectively clads a conducting wire, each conducting wire has two conductive ends respectively extended to the first series connection portion and the second connection portion, and the two conductive ends are respectively electrically connected to the two electrical elements.

5. The cascade device for flexible electrical elements as claimed in claim 4, wherein the two electrical elements are batteries.

6. The cascade device for flexible electrical elements as claimed in claim 4, wherein the first and second flexible ribs cross and are integrally formed.

7. The cascade device for flexible electrical elements as claimed in claim 6, further comprising reinforcement ribs formed between respective ends of the first and second flexible ribs, for reinforcing the flexible structure for withstanding an external force.

8. The cascade device for flexible electrical elements as claimed in claim 4, wherein the two conductive ends of each conducting wire respectively extend through the first series connection portion and the second series connection portion to be electrically connected to the electrical elements.

9. The cascade device for flexible electrical elements as claimed in claim 8, further comprising a control unit electrically connected to the cascade unit.

10. The cascade device for flexible electrical elements as claimed in claim 8, wherein each of the two electrical elements is respectively enclosed by a housing.

11. The cascade device for flexible electrical elements as claimed in claim 10, wherein the first and second series connection portions each comprise waterproof grooves, and an inner edge of each housing comprises waterproof ridges for embedding into the waterproof grooves.

12. The cascade device for flexible electrical elements as claimed in claim 11, wherein each housing comprises an upper cover and a lower cover covered onto each other.

* * * * *